United States Patent [19]

Gould et al.

[11] Patent Number: 4,723,746
[45] Date of Patent: Feb. 9, 1988

[54] ELECTRICAL BOX MOUNTING BRACKET

[75] Inventors: Paul Gould, Ile Bizard; Michael A. Ryan, Pointe Claire, both of Canada

[73] Assignee: Temco Electric Products Company Inc., Montreal, Canada

[21] Appl. No.: 77,755

[22] Filed: Jul. 27, 1987

[51] Int. Cl.$^4$ .............................................. H02G 3/10
[52] U.S. Cl. ................... 248/205.1; 248/300; 248/228; 248/DIG. 6; 220/3.6; 220/3.9; 174/58
[58] Field of Search ............... 248/DIG. 6, 27.1, 34.2, 248/205.1, 300, 27.3, 228, 231.8, 231.9; 220/3.3, 3.5, 3.6, 3.9; 174/58

[56] References Cited

U.S. PATENT DOCUMENTS

| | | | |
|---|---|---|---|
| 3,360,151 | 12/1967 | Yznaga | 220/3.9 |
| 3,684,230 | 8/1972 | Swanquist | 248/229 |
| 3,730,466 | 5/1973 | Swanquist | 248/216 |
| 4,483,453 | 11/1984 | Smolik | 248/DIG. 6 |
| 4,497,416 | 2/1985 | Smolik | 248/DIG. 6 |

FOREIGN PATENT DOCUMENTS 838323  3/1970  Canada .

OTHER PUBLICATIONS

Commander Brochure, dated 1st Nov. 1986, various pages including p. 38.
Raco Brochure, dated Apr. 1986, various pages including p. 13.
Canadian Standards Association (CSA) Booklet, various pages including p. 30.
Appleton "Snap-In" Boxes, 6.22.87, p. 2, advertising fly sheet.

Primary Examiner—Reinaldo P. Machado
Assistant Examiner—Alvin Chin-Shue
Attorney, Agent, or Firm—Bacon & Thomas

[57] ABSTRACT

A bracket for securing an electrical box or other electrical component can be used in either of two ways. Firstly by attachment to the open face of cross-sectionally U-shaped metal channel studding or secondly to the reverse face of the same studding or to another substantially flat surface. The clip comprises a back plate with stepped wing portions on two opposite sides. Marginal areas of the second stepped wing portions on both sides of the clip are removed to allow insertion of the clip behind lips conventionally found in channel studding. The free edges of the wing portions lie in a plane parallel to the back plate allowing mounting on a flat surface using screws or similar means for which the clip provides holes. The clip may be attached in either of the two ways without intervening modification of its design.

14 Claims, 7 Drawing Figures

ELECTRICAL BOX MOUNTING BRACKET

BACKGROUND OF THE INVENTION (i) Field of the Invention

The present invention relates to an electrical box mounting bracket and to an electrical box assembly comprising an electrical box or any similar component connected to such a bracket.

More particularly, this invention relates to a unitary electrical box mounting bracket which may be attached to either side of a standard steel or other stud conventionally used in the construction of walls of new buildings, or directly to any substantially flat surface without intermediate modification of the bracket.

(ii) Brief Description of the Prior Art

In the construction of walls for residential or commercial buildings, use is frequently made of steel channel studding (or stud) having two lateral opposing walls and one back wall so that the studding is U-shaped in cross-section. This studding may be of various standard sizes (e.g. 2"×4") and is commonly characterised by inturned right-angled lips at the free edges of its lateral walls. Furthermore the studding generally carries a wide but, shallow recess along the length of the reverse face of its back wall in order to strengthen the studding. Thus the reverse face of the studding is not completely flat.

Efforts have been made to design a clip for attachment to such studding while making use of the inherent characteristics of the stud.

By way of example, U.S. Pat. Nos. 3,684,230 and 3,730,466 disclose box mounting devices which clip onto an electrical box and are sprung to be held in position by the stud.

Commander, a company of St Jean-sur-Richelieu, Quebec, Canada, produces a clip, advertised on page 38 of its brochure, for attachment of a box to studding. The clip is pliable and is molded using pliers round the contours of the stud.

Canadian Pat. No. 383,323 discloses an electrical box mounting clip using two U-shaped grippers which are sprung to retain the clip behind the lips of the stud. Such a clip may only be secured in the open, forward face of the stud. However in the supplementary disclosure attached to this Canadian patent, a further modification of the clip allows the two U-shaped grippers to be removed by the application of pliers in order that the clip may be secured to the reverse face of the back wall of the stud using screws or similar means.

RACO Inc., a company of South Bend, Ind., USA, produces a snap-in bracket attached to square boxes. This bracket is shown on page 13, 17th edition, of that company's 1986 catalogue. These brackets are designed to snap into the open face of standard studding. This is achieved by a winged arranged of the bracket with appropriate pieces cut away to accomodate the lips of the stud. However this design suffers from being only attachable to one face, namely the open face of the stud, and when attached, the RACO bracket suffers from some instability which is undesirable when constructing the electrical infrastructure of a building.

Therefore, it is clearly desirably to have a bracket which may be quickly and securely fastened to studding in forward or reverse orientation or to any flat surface.

OBJECTS OF THE INVENTION

It is an object of the present invention to provide such a bracket which is unitary in nature, i.e. one from which no parts have to be removed or bent or otherwise formed for the operation of the bracket.

It is a further object of this invention to provide a bracket which may be inserted quickly into, and held fast by, the open face of U-shaped studding.

It is also an object of this invention to provide a bracket which may be attached to any substantially flat surface.

It is an additional object of the present invention to provide a bracket designed to be attached to the reverse face of metal studding in such a way that the bracket is accommodated by the shallow recess on this reverse face.

It is a further object of this invention to provide an electrical box assembly consisting of an electrical box or similar component connected to a bracket that fulfils any of the above objects.

SUMMARY OF THE INVENTION

In meeting these objects, and others, the invention provides a bracket for securing an electrical box or other electrical component either:

(a) in a clip mode, to an open face of cross-sectionally U-shaped metal channel studding having a back wall and two lateral opposing walls ending at free edges defining inturned lips themselves having outer and inner surfaces; or (b) in a securing mode, to a reverse face of said metal studding or other substantially flat surface.

The bracket comprises: a four sided back plate having a lower surface and an upper surface to which, the electrical box, or other component, may be directly attached. The plate has stepped wing portions on two opposite sides. Each stepped wing portion on each of the opposed sides comprises:

(i) a first wing portion extending downwardly at about 90° to the plate;

(ii) a second wing portion extending outwardly at about 90° to the first wing portion;

(iii) a third wing portion, extending downwardly at about 90° from the second wing portion.

The two third wing portions finish at edges which are approximately parallel to each other and which both lie in a planeparallel to the plane of the back plate.

The two second wing portions have marginal (i.e. near the free edges) areas punched out. On one of the opposed sides, at least one distal rectangular section is removed from each marginal area. This leaves two remaindered sections whose lower surfaces, in clip mode, abut the outer surface of the corresponding studding lip. These lips simultaneously occupy the gaps left by the distal punched out sections.

On the other of the opposed sides of the bracket, two rectangular sections are removed from both marginal areas. This leaves centrally positioned (relative to the second wing portion in question) tabs. The lower surfaces of these tabs, in clip mode, abut the outer surfaces of the corresponding studding lips.

The two second wing portions each provide at least two holes for passage of securing means such as screws.

The invention also provides an electrical box assembly consisting of an electrical box or any other electrical component connected to the bracket defined above.

The bracket or box assembly according to the invention, provides a more secure means of mounting electrical building materials than was previously available.

The design conforms to the minimum weight requirement of the Canadian Standards Association (CSA) as defined in paragraph 6.9.3 on page 30 of the test book C22.2 No 18-M1987.

The bracket according to the invention may be of variable size, however it is particularly envisaged that it will be used in conjunction with standard 2×4 inch steel studs or 2×3 inch versions if they become available.

The metal used to make the bracket according to the invention, is thinner than that used for the above mentioned RACO bracket. This means that the bracket of this invention may be used with 0.020 inch gauge studding (25 AWG metal) whereas the abovementioned RACO clip is unstable on such thin studding.

Using thinner gauge material furthermore reduces the cost.

BRIEF DESCRIPTION OF THE DRAWINGS

The objects, advantages and other features of the present invention will become more apparent upon reading the following non-restrictive description of a preferred embodiment thereof, given for the purpose of exemplification only, with reference to the accompanying drawings in which.

Figure 1:
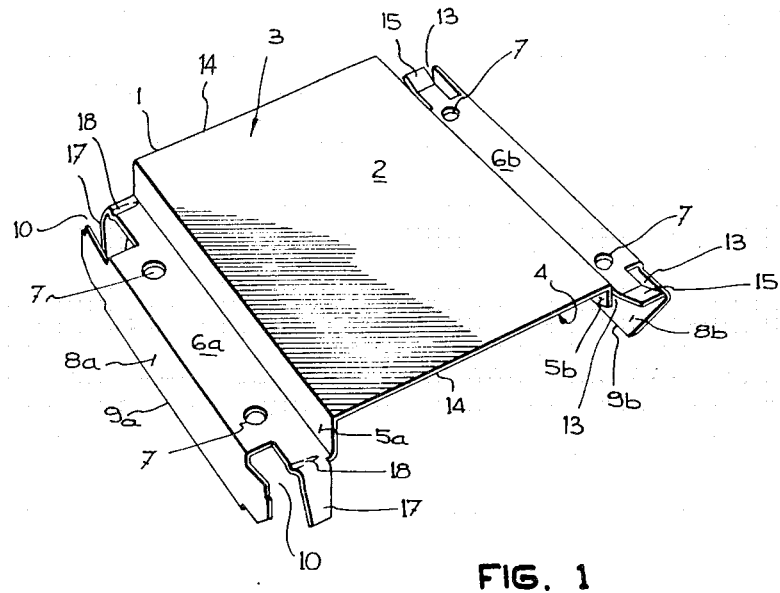
FIG. 1 is a perspective view of a bracket according to the invention.

In the following discourse and throughout the specification, the terms "margin" and "marginal" are used to denote the free, non-winged sides (14) and the areas close to these sides of the bracket (see FIG. 1). The terms "distal" and "proximal" have their usual meaning in relation to an axis running centrally along the back plate (2)—see FIG. 1—parallel to the winged sides. Furthermore, when 'a' and 'b' parts are discussed collectively, only the preceding numeral is used. For example, (6) is equivalent to (6a and 6b). The expressions "above", "beneath", "below", etc . . . are only for descriptive convenience in relation to the figures and are not intended to restrict the generality of the invention. The same reference numerals apply to all figures.

DETAILED DESCRIPTION OF THE INVENTION

The bracket (1) shown in FIG. 1, consists of a back plate (2) which has an upper surface (3) and a lower surface (4). These upper and lower surfaces are continuous throughout the bracket. The winged design of the bracket is clear from this drawing which shows a first wing portion (5) extending from each of a pair of opposite sides of the bracket at approximately 90° to the back plate (2). A second wing portion (6) extends from the lower edge of each first portion (5) in a plane approximately parallel to the plane of the back plate (2). This second wing portion is provided with holes (7) for the passage of screws (19)—see FIG. 7—or similar. A third wing portion (8) extends from the distal edge of each second portion (6) in a plane approximately perpendicular to the plane of the back plate (2). The third portions (8a and 8b) finish at edges (9a and 9b respectively) which are approximately parallel to each other and both lie in a plane approximately parallel to the back plate (2).

The second wing portions (6) of the bracket (1) have various sections removed. On one of the opposite sides of the bracket, two rectangular corner areas (10) are punched out from the second portion (6a) at the marginal junction of this second (6a) and the third (8a) wing portions, to leave a pair of remaindered sections.

On the other side of the bracket, sections (13) are punched out from the second wing portion (6b) both at the marginal junction between second (6b) and third (8b) wing portions, and at the marginal junction between first (5b) and second (6b) wing portions, to leave therebetween a pair of tabs (15).

Figure 2:
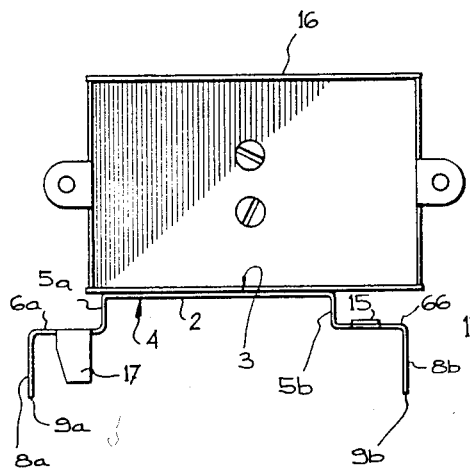
FIG. 2 is a side elevational view of the bracket shown in FIG. 1, shown attached to an electrical device box.
Figure 3:
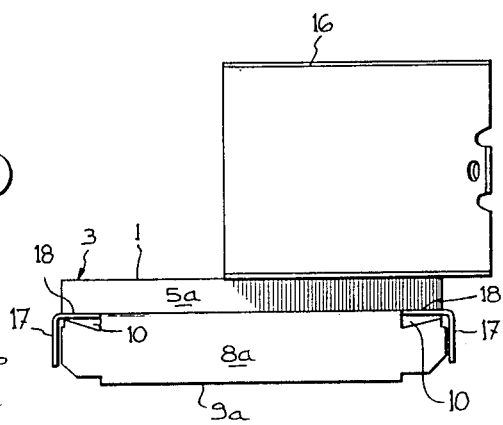
FIG. 3 is a front elevational view of the bracket shown in FIG. 1, shown attached to an electrical device box.

FIGS. 2 and 3 respectively show side and front elevational views of the bracket with an electrical box (16) connected to the back plate (2). The box (16) is offset from the centre of the bracket (1) so as to allow tool access to at least three of the holes (7) in the second wing portions (6).

OPERATION OF THE INVENTION AND PREFERRED EMBODIMENTS

Figure 7:
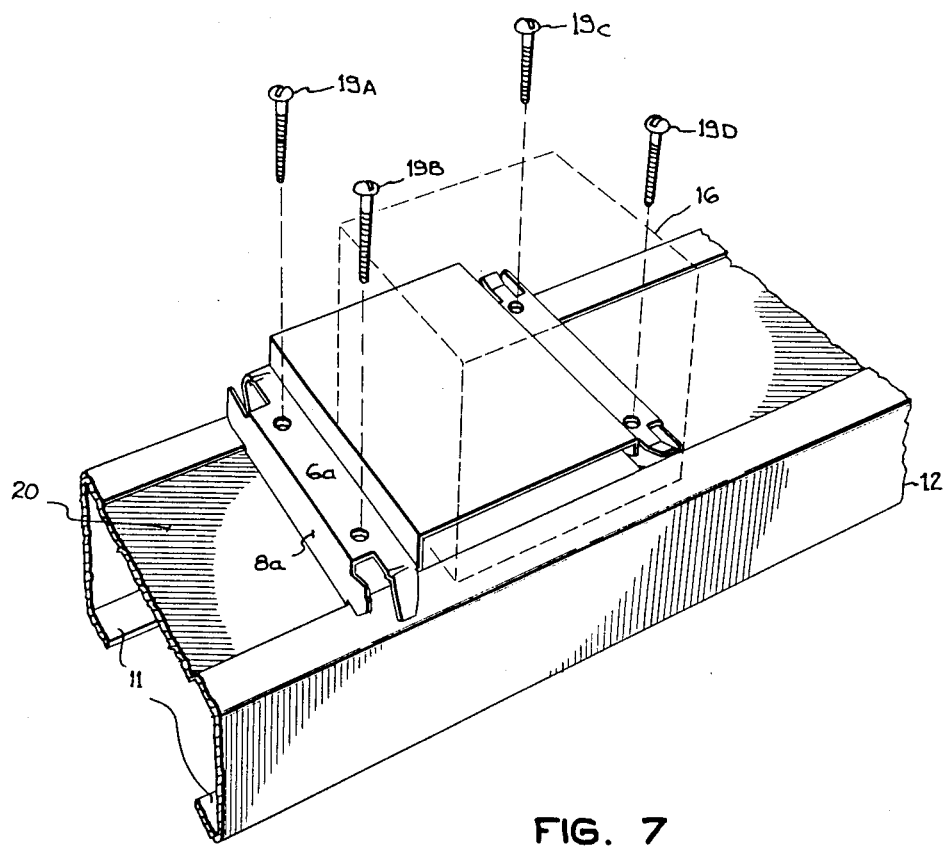
FIG. 7 shows the orientation of the bracket shown in FIG. 1, with an attached electrical box in dotted outline, when the bracket is to be attached to the reverse face of a stud.
Figure 5:
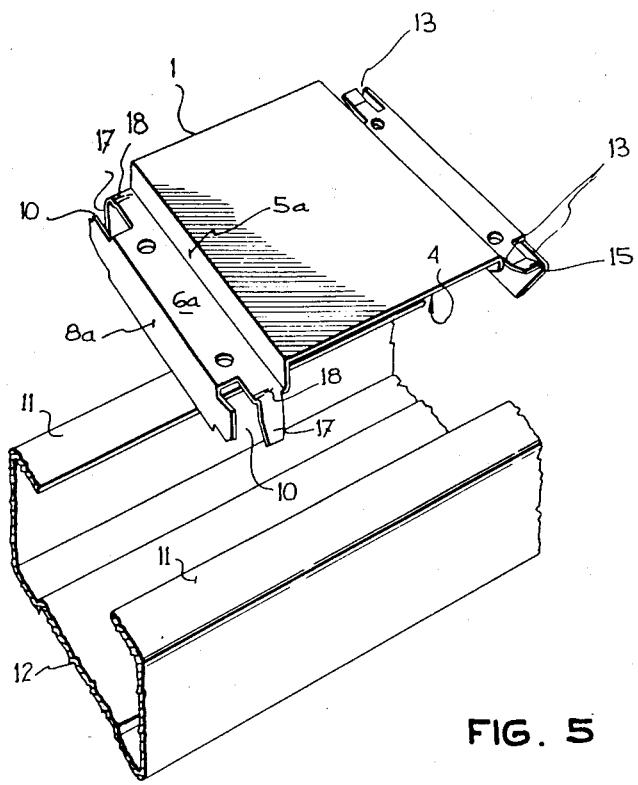
FIG. 5 shows the orientation of the bracket of FIG. 1 when it is to be attached to the open face of standard channel studding.

The bracket may be used in one of two modes. The first one is a "clip" mode wherein the bracket is inserted into the open face of standard U-shaped studding provided with "lips" (11), as shown in FIG. 5. The second mode is a "securing" mode wherein screws or other securing means are used to attach the bracket to the reverse face of standard studding or to any other substantially flat surface such as wooden studding, gyprock or hardboard, as shown in FIG. 7.

Figure 6:
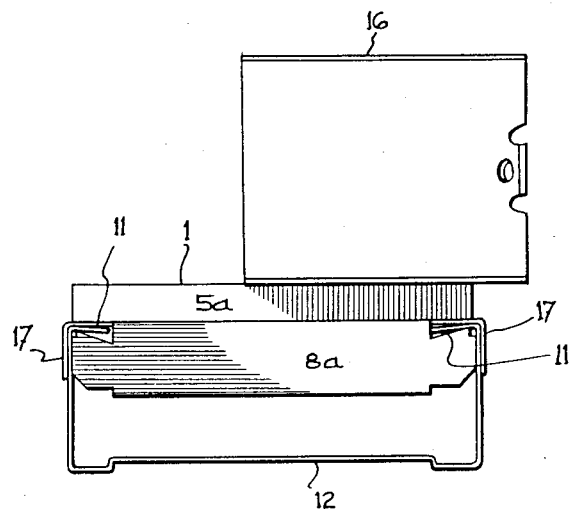
FIG. 6 is a front elevational view partly in cross-section of the bracket of FIG. 1 attached to an electrical device box, when the bracket is held in the studding.

In clip mode (FIGS. 5 and 6), the bracket is inserted using an upended twisting motion so that the third wing portion (8a) is first inserted into the stud beneath the stud lips (11) with the lips (11) passing over the marginal region of this portion (8a), and thereby occupying the punched out area (10) in portion 6a. The remaindered marginal section of the second wing portion (6a) rests on top of the lips (11).

Advantageously, the punched out area (10) may be slightly extended into portion 8a to facilitate entry into the stud.

In a preferred embodiment, a downward crimp (18), parallel to the margin is modelled in the remaindered marginal section of the second wing portion (6a). This crimp (18) serves to increase grip between the lower surface (4) of the bracket in the wing portion (6a), with the upwardly facing surface of the stud lips (11).

Preferably, a tab (17) is included in, and extends downwardly from the remaindered proximal marginal section of the second wing portion (6a), at a 90° angle. Its function is to keep the stud closed and thereby hold the bracket more firmly in place.

In order to secure the opposite, still unattached side of the bracket to the stud, this unattached side is pushed down into the channel of the stud so that third wing portion 8b, engages with the stud lips (11) until the tab (15) in the marginal area of the second wing portion (6b) rests firmly on the upward facing surface of the lips (11) which at the same time pass over the marginal area of the third wing portion (8b). The lips (11) therefore occupy the punched-out areas (13) either side of the tab (15) in this second wing portion (6b) of the clip.

Figure 4:
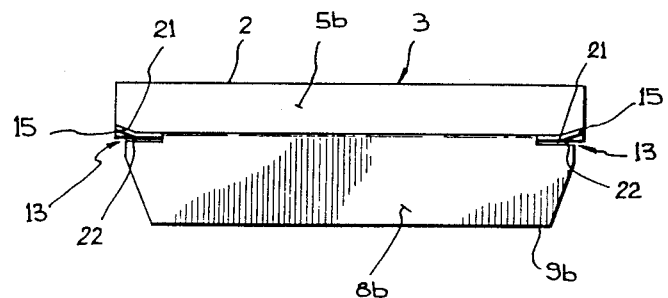
FIG. 4 is a rear elevational view of the bracket shown in FIG. 1.

As seen in FIG. 4, the third wing portion (8b) preferably has angled margins each defining a straight line finishing at the edge (9b) of the third wing portion (8b) so that the length of the edge (9b) is less than the length of the winged sides of the plate. This arrangement facilitates entry into and behind the stud lips.

As is seen in FIG. 4, it is preferred that the tabs (15) be bent slightly upwards at about their half way point. As a result a slight valley (21) is formed on the upper surface of the tab, corresponding to a peak (22) on its lower surface. This peak (22) abuts the outer surfce of the stud lips (11) when the bracket (1) is used in clip mode, thus providing a tighter grip.

Looking at FIG. 7, it is clear how the bracket (1) may be secured to the reverse side of standard electrical studding (12).

Preferably, the edges (9) of the third wing portions (8) are of the same length, that length being approximately equal to the dimensions of the recess (20) commonly found on the reverse face of the stud (12).

Thus in FIG. 4, the margins of third portion 8b are so shaped not only to facilitate entry into the open face of the stud (12), as noted above for clip mode, but also to provide the correct length of edge 9b for position in the recess (20) on the reverse face of the stude for securing mode.

Similarly, the design of third wing portion 8a—see FIG. 3—is preferably such that edge 9a is of the correct length for insertion into the shallow recess (20) found on the reverse side of standard U-shaped studding. These last two embodiments prevent dislocation of the bracket after mounting on the reverse face of studding.

As noted above, the two edges (9) lie in a plane which is approximately parallel to the plane of the back plate (2). This means that the clip (1) may be secured to any substantially flat surface in securing mode and is not therefore limited to use with standard metal studding of the type discussed.

As noted above, the electrical box (16) is offset from the bracket (1) as shown in dotted outline in FIG. 7. This allows screws (19a, b and c) to be attached without encumbrance so that at least one screw may pass through each second wing portion (6a and 6b) to hold the bracket (1) in place.

The bracket may be attached to an electrical box in any known way but it is preferred to attach it by crimping, riveting or welding.

It is, of course, possible to use the holes (7) in the second wing portions (6) as securing means even when the bracket (1) is being used in clip mode. This option is available if unusually strong mounting is required.

While there have been shown and described what are at present believed to be the preferred embodiments of the invention, it will be obvious to those skilled in the art that various changes and modifications may be made to them without departing from the scope of the invention as defined by the appended claims.

What is claimed is:

1. A bracket for securing an electrical box or other electrical component either:
   (a) in a clip mode, to an open face of cross-sectonally U-shaped metal channel studding having a back wall and two lateral opposing walls ending at free edges defining inturned lips themselves having outer and inner surfaces; or
   (b) in a securing mode, to a reverse face of said metal studding or other substantially flat surface, wherein said bracket comprises:
   a four sided back plate having a lower surface and an upper surface to which may be directly attached said box or other component;
   said plate having stepped wing portions on two opposed sides thereof, each stepped wing portion on each of said opposed sides comprising:
      (i) a first wing portion extending downwardly at about 90° to said plate;
      (ii) a second wing portion, extending outwardly at about 90° from said first wing portion;
      (iii) a third wing portion, extending downwardly at about 90° from said second wing portion;
   wherein the two third wing portions finish at edges parallel to each other and parallel to a plane in which lies said plate;
   wherein the second wing portion on one of said opposed sides has two marginal areas from each of which is punched out at least one distal rectangular section leaving a remaindered section whose lower surface, in clip mode, is in abutting relationship with the outer surface of the corresponding studding lip which simultaneously occupies said punched out distal section;
   wherein the second wing portion on the other of said opposed sides has two marginal areas from each of which are punched out, two rectangular sections, leaving a centrally positioned tab, so that, in clip mode, the lower surfce of said tab is in abutting relationship with the outer surface of the corresponding studding lip;
   and wherein the two second wing portions each provide at least two holes for passage of securing means.

2. A bracket according to claim 1 wherein each of said remaindered sections includes a crimp approximately parallel to the non-winged sides of said plate, pointing downwardly from the lower surface of said section so as to abut, in clip mode, the outer surface of the corresponding studding lip.

3. A bracket according to claim 1, wherein downwardly from and contiguously with each of said remaindered sections additionally extends a side tab at an angle of about 90°.

4. A bracket according to claim 1, wherein each of said remaindered sections includes a crimp approximately parallel to the non-winged sides of said plate, pointing downwardly from the lower surface of said section, so as to abut, in clip mode, the outer surface of the corresponding studding lip; and wherein downwardly from and contiguously with each of said remaindered sections additionally extends a side tab at an angle of about 90°.

5. A bracket according to claim 1, wherein said edges of said third wing portions are less than or equal in length to a recess conventionally found on the reverse face of said studding.

6. A bracket according to claim 1, wherein each of said remaindered sections includes a crimp approximately parallel to the non-winged sides of said plate, pointing downwardly from the lower surface of said section, so as to abut, in clip mode, the outer surface of the corresponding studding lip; and wherein downwardly from, and contiguously with, each of said remaindered sections, additionally extends a side tab at an angle of about 90°; and wherein said edges of said third wing portions are less than or equal in length to a recess conventionally found on the reverse face of said studding.

7. An electrical box assembly consisting of an electrical box or other electrical component connected to a bracket for attachment, either:

(a) in a clip mode, to an open face of cross-sectionally U-shaped metal channel studding having a back wall and two lateral opposing walls ending at free edges defining inturned lips themselves having outer and inner surfaces; or (b) in a securing mode, to a reverse face of said metal studding or other substantially flat surface, wherein said bracket comprises:

a four sided back plate having a lower surface and an upper surface to which may be directly attached said box or other component;

said plate having stepped wing portions on two opposed sides thereof, each stepped wing portion on each of the opposed sides comprising:

(i) a first wing portion extending downwardly at about 90° to the plate;

(ii) a second wing portion extending outwardly at about 90° to the first wing portion;

(iii) a third wing portion, extending downwardly at about 90° from the second wing portion.

wherein the two third wing portions finish at edges parallel to each other and parallel to a plane in which lies said plate;

wherein the second wing portion has, on one of said opposed sides, two marginl areas from each of which is punched out at least one distal rectangular section leaving a remaindered section whose lower surface, in clip mode, is in abutting relation ship with the outer surface of the corresponding studding lip which simultaneously occupies said punched out distal sections;

wherein the second wing portion on the other of said opposed sides, has two marginal areas from each of which are punched out two rectangular sections, leaving a centrally positioned tab, so that, in clip mode, the lower surface of said tab is in abutting relationship with said outer surface of the corresponding studding lip;

and wherein the two second wing portions each carry at least two holes for passage of securing means.

8. The electrical box assembly of claim 7, wherein the box is so attached as to allow tool access to at least three of said holes not all on the same opposed side of said bracket.

9. The electrical box assembly of claim 7, wherein the attachment is by one of the group: crimping, riveting and welding.

10. The electrical box assembly of claim 7, wherein each of said remaindered sections includes a crimp approximately parallel to the non-winged sides of to corresponding plate, pointing downwardly from the lower surface of said section so as to abut, in clip mode, the outer surface of the corresponding studding lip.

11. The electrical box assembly of claim 7, wherein downwardly from, and contiguously with, each of said remaindered sections additionally extends a side tab at an angle of about 90°.

12. The electrical box assembly of claim 7, wherein each of said remaindered sections includes a crimp approximately parallel to the non-winged sides of said plate, pointing downwardly from the lower surface of said section so as to abut, in clip mode, the outer surface of the corresponding studding lip; and wherein downwardly from, and contiguously with, each of said remaindered sections additionally extends said a side tab at an angle of about 90°.

13. The electrical box assembly of claim 7, wherein said edges of said third wing portions are less than or equal in length to a recess conventionally found on the reverse face of said studding.

14. The electrical box assembly of claim 7, wherein each of said remaindered sections includes a crimp approximately parallel to the non-winged sides of said plate, pointing downwardly from said the lower surface of said section so as to abut, in clip mode, the outer surfce of the corresponding studding lip; and wherein downwardly from, and contiguously with, each of said remaindered sections additionally extends a side tab at an angle of about 90°; and wherein said edges of said third wing portions are less than or equal in length to a recess conventionally found on the reverse face of said studding.

* * * * *